United States Patent [19]

Hutchison et al.

[11] 3,727,703
[45] Apr. 17, 1973

[54] WELL CIRCULATION FLUID FOR USE IN PERMAFROST

[75] Inventors: Stanley O. Hutchison, Bakersfield; Glen W. Anderson, Oildale, both of Calif.

[73] Assignee: Chevron Research Company, San Francisco, Calif.

[22] Filed: Oct. 22, 1971

[21] Appl. No.: 191,655

Related U.S. Application Data

[63] Continuation-in-part of Ser. No. 77,083, Sept. 30, 1970, abandoned, and a continuation-in-part of Ser. No. 130,511, April 1, 1971, abandoned.

[52] U.S. Cl. .................. 175/69, 175/17, 166/DIG. 1
[51] Int. Cl. ............................................. E21b 21/04
[58] Field of Search ........................ 175/69.71, 17; 166/242, 302, 309, DIG. 1

[56] References Cited

UNITED STATES PATENTS

| 3,303,896 | 2/1967 | Tillotson et al. | 166/309 X |
| 3,463,231 | 8/1969 | Hutchison et al. | 175/69 X |
| 3,610,340 | 10/1971 | Hutchison et al. | 175/69 X |
| 3,618,681 | 11/1971 | Bartlett | 175/17 |
| 3,642,065 | 2/1972 | Blount | 166/DIG. 1 X |

OTHER PUBLICATIONS

Engineering Index, 1965, p. 1553.
Petroleum Abstracts, No. 61, 375. Nov. 27, 1965.

*Primary Examiner*—David H. Brown
*Attorney*—A. L. Snow et al.

[57] ABSTRACT

Aqueous gas and liquid foams are generated using a gas and an aqueous foamable solution and are used as well circulation fluids in drilling and cleanout operations in holes in permafrost.

11 Claims, 2 Drawing Figures

PATENTED APR 17 1973    3,727,703

WELL CIRCULATION FLUID FOR USE IN PERMAFROST

RELATED APPLICATIONS

This application is a continuation-in-part of application Ser. No. 77,083, filed Sept. 30, 1970, now abandoned and application Ser. No. 130,511, filed Apr. 1, 1971, now abandoned and the disclosure of these applications is hereby incorporated herein by reference.

FIELD OF THE INVENTION

The present invention is directed to providing a circulating fluid for use in operations in holes in permafrost. More specifically, the present invention provides for preparing a gas/liquid foam for use in drilling and in hole cleanout operations wherein the hole penetrates permanently frozen earth known as permafrost.

BACKGROUND OF THE INVENTION

A serious problem is found when attempting to drill holes in frozen ground known as permafrost. Permafrost is found in many areas of the North and is defined as permanently frozen ground. Heretofore, no satisfactory method has been found for drilling holes in the permafrost. Conventional drilling methods, i.e., one in which a drilling mud is circulated, have not been successful because the drilling mud tends to heat the permafrost to the point where it melts and erodes away. This prevents making a hole in the permafrost and in many cases has actually endangered both the subsurface drilling equipment and the supporting surface on which the drilling equipment is located. Other problems associated with wet drilling in permafrost areas arise out of the weather conditions under which much of the drilling is done. Since much of the work in these areas is done in the winter because of the tendency of the surface melting the temperatures at which the work is done are very low, often at −50° F or colder. Keeping liquid mud flowing at these temperatures can be a serious problem.

The method heretofore used to make holes in the permafrost has been the use of dry augers or other type of dry drilling apparatus. These apparatus, for example, require impact force or torque to drive them into the permafrost. After being so driven they are used to break off small pieces of the permafrost to eventually provide a hole therein. Thus holes for piles which are used to support most structures in permafrost areas and at least the initial portion of most wells have often been drilled by such dry methods. Needless to say these dry methods are slow and expensive.

In adapting the use of foam as a circulating medium in holes located or drilled into the permafrost, it was first felt that freezing point depressants, i.e., antifreeze, would necessarily be added to the liquid used to make the foam so that the temperature of the liquid could be reduced below the freezing point of the permafrost, i.e., 32° F. However, in experiments conducted with freezing point depressants such as alcohol or antifreeze, it was found that the alcohol or antifreeze actually worked to melt the liquid in the permafrost and to thus cause a serious erosion problem. It has now been found that foam, when prepared as taught herein, is an excellent circulating fluid for use in permafrost operations. However, certain specific techniques are necessarily utilized in order for the foam to achieve success in permafrost operations.

BRIEF DESCRIPTION OF THE INVENTION

The present invention provides a method of drilling or doing remedial work in a hole located in permafrost utilizing a specially prepared preformed foam. A gas and liquid foam is prepared by mixing a gas with a liquid foamable solution. The temperature of the liquid foamable solution is adjusted to a value between just above its freezing point and below 60° F. The liquid and the gas are contacted in a foam generator in a gas-to-liquid volume ratio, standard cubic feet per gallon, respectively, in the range of 3 to 50 to 1. The preformed foam is then injected into a hole penetrating the permafrost and circulated at an annular velocity of below about 600 feet per minute so that drilling, hole cleanout or other hole operations needing a circulating fluid may be performed.

OBJECTS OF THE INVENTION

A particular object of the present invention is to provide a method of drilling a hole in permafrost utilizing a specially prepared gas and liquid foam circulation fluid. Further objects and advantages of the present invention will become apparent from the following detailed description read in view of the accompanying drawing.

DETAILED DESCRIPTION OF THE PREFERRED EMBODIMENT

Figures 1, 2:
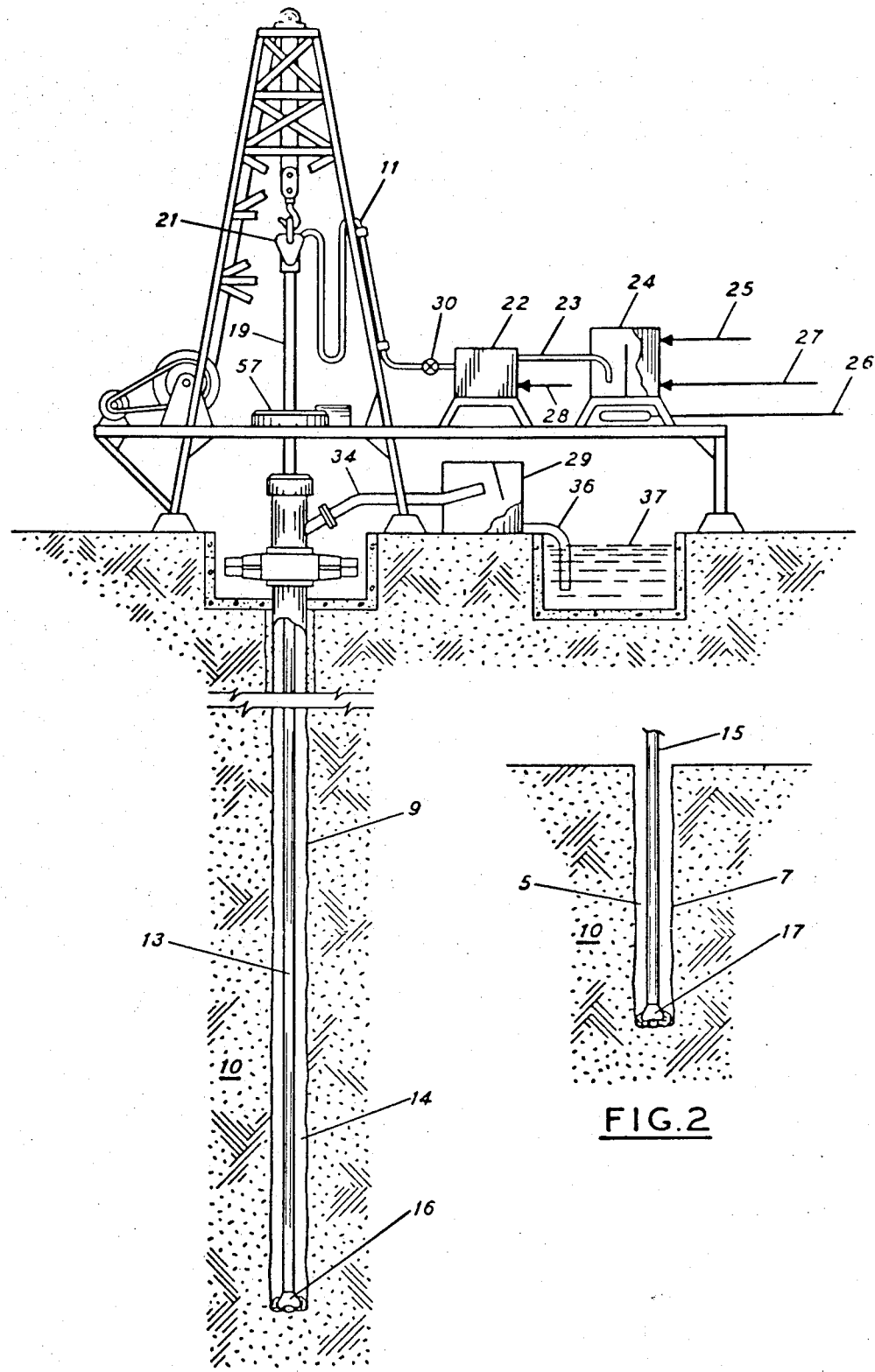
FIG. 1 is an elevation view, partially in section, of a well penetrating permafrost and illustrates the preferred embodiment of apparatus assembled in accordance with the present invention for use in drilling a hole.
FIG. 2 is a partial elevation view illustrating the apparatus of the present invention drilling an open hole.

Refer now to FIG. 1 where the preferred form of apparatus assembled in accordance with the present invention is shown. A hole 9 is shown being drilled through permafrost 10. The hole is drilled by means of bit 16. The bit 16 is rotated by means of drill pipe 13.

A rotary drill table 57 connected to Kelly bar 19 and drill pipe 13 is rotated to cause the drill bit 16 to be rotated. A suitable swivel 21 is connected between the Kelly bar 19 and a foam generator 22 by means of line 11 through valve 30. The rotation of the drill breaks the permafrost into chips. These chips, in accordance with the invention, are carried up annulus 14 by means of a foam circulating fluid injected through the interior drill pipe 13 and up the annulus 14 to the earth's surface.

The method of the present invention is useful for many types of drilling in permafrost. For example, most structures that are constructed on permafrost must be placed on piles. These piles are first positioned in holes drilled for them in the permafrost. Considerable savings can result using foam for drilling such pile holes. Another use of foam as a circulating fluid is found in the drilling of wells in the permafrost. Foam is particularly useful in the initial portion of the drilling of a well.

The foam used in accordance with the invention is comprised of water containing a foamable solution and a suitable gas such as air. Other gases, of course, such as nitrogen may be used. The gas and liquid foam is formed of a plurality of small bubbles. Thus foam has a very low thermal conductivity and minimizes heat transfer between the foam and the permafrost which forms the wall of the hole. A particularly surprising feature of the foam of the present invention is that the edge portion of the foam which contacts the permafrost freezes and when frozen retains its cellular structure. This frozen annular ring of foam on the outer periphery of the circulating foam in the drill string-well wall annulus helps to prevent settling or sloughing of the permafrost into the hole. Further, the frozen cellular foam ring serves as a good insulator between the cold permafrost and the warmer circulating foam.

For the generation of a gas in liquid foam, in accordance with the invention, water and a detergent concentrate are delivered to mixer 24 via lines 25 and 27. These fluids are delivered at rates sufficient to produce in mixer 24 a foamable solution which contains in parts by weight for each 100 parts thereof about 0.1 to 1.0 parts of an organic foaming agent, for example, the sodium salt of a linear $C_{12}$–$C_{16}$ alkyl benzene sulfonate acid mixture. It is also in accordance with the present invention to provide a pre-mixed foaming solution in mixer 24. Thermal coils 26 are provided to adjust the temperature of the foamable solution to within the range of from just above the freezing point of the solution to less than about 60° F. The temperature of the foam is adjusted to prevent freezing before it enters the well. Foam temperatures of up to 60° F have been used in field operations without causing undue erosion of the hole. Foam temperatures entering the well are preferably about 40° F or less. Depending on the temperature prevailing when the operation is being conducted, the thermal coil may be either a heating coil or a cooling coil as necessary to maintain such a temperature.

The foamable solution is directed to foam generator 22 by means of conduit 23. Air or other suitable gas is also delivered to the foam generator 22 via line 28. The rates of delivery of the foamable solution and the gas are such to form a foam having a gas-to-liquid volume ratio (CF/Gal) in the range of 3–50 to 1. Foam is generated in the foam generator and delivered to the well under pressures sufficient to circulate the foam in the well via line 11 at a rate of below 600 feet per minute and preferably below 300 feet per minute velocity up the pipe string annulus 14. Foam returning up annulus 14 is directed through blooie line 34 to a foam breaker 29 wherein foam is broken into liquid and gas components. The liquid component is removed from foam breaker 29 by means of line 36 and is deposited in foam sump 37.

FIG. 2 illustrates apparatus assembled in accordance with the invention when used to drill a simple post hole. As there shown, a drill bit 17 is connected to a surface rotating means (not shown) by a drill pipe 15. Foam is injected down the drill pipe and is circulated up the drill pipe-hole annulus 5 to the surface.

In accordance with the invention, the temperature of the foamable solution is reduced below about 60° F and satisfactory results are obtained in drilling a hole in the permafrost. In operations where the foam will not be left undisturbed for lengthy periods in the hole, i.e., for post hole drilling, relatively pure water is preferred. That is, the foamable solution should consist of an organic foaming agent and preferably relatively pure water. The use of relatively pure water, i.e., free of salts, permits efficient and desirable disposal of the foam after use.

It has been found, however, that in operations where the foam may have long residence time in the hole that salt is useful in the water to inhibit undesirable freezing of the foam. For example, in deeper holes, i.e., over about 300 to 500 feet, it has been found that about 10 percent by weight salt effectively acts to inhibit undesirable freezing of the foam. This is particularly true in areas where the outside surface temperature may be −50° F or lower. Thus it is preferred to use water having a salt concentration greater than seawater which is approximately 3-½ percent by weight when making foam for the deeper holes. When the water used to make foam contains salt in amounts up to 10 percent by weight, it is desirable that more sophisticated foaming agents to be used to form the foam. Thus in applications where a salt, such as sodium chloride, calcium chloride or sodium sulfate, is used to inhibit undesirable freezing of the foam a foaming agent such as an ethoxylated alcohol sulfate salt is useful. These foaming agents have the general formula $R(OCH_2CH_2)_n OSO_3M$, where R is a hydrocarbon radical, n is in the range 3 to 20 and M is alkali metal or ammonium cation. Specific foaming agents which are useful in these operations include an alcohol ethoxy sulfate, $RO(CH_2CH_2O)_3SO_3Na$, where $R = C_{11}$-$C_{15}$. Another useful foaming agent is formed of the ammonia salt of a sulfated linear $C_{12}$–$C_{13}$ alcohol ethoxylate $[RO(CH_2CH_2O)_nSO_3NH_4]$ averaging about 3 ethoxylate units per mol. A particularly useful foaming agent is sold by the Nalco Chemical Company under the trademark ADAFOAM BF1. This is a built foaming agent which has given good results. In general, these foaming agents are useful when added to the water in an amount between 0.5 to 1 percent by weight. The gas-to-liquid ratio is maintained in the range of 3–50 to 1 CF to gallon.

Although only certain preferred embodiments of the present invention have been described in detail, the invention is not meant to be limited to only these embodiments but rather to the scope of the appended claims.

We claim:

1. A method of circulating foam in a hole in permafrost comprising forming a preformed foam by mixing liquid containing a foaming agent with a gas in a gas-to-liquid ratio (CF/Gal) of from 3–50 to 1 to form a foam, said liquid having a temperature below about 60° F and higher than the freezing point of the liquid, injecting said foam into a hole in the permafrost and circulating said foam up said hole to the surface.

2. The method of claim 1 including the step of forming an annular ring of frozen foam in the hole adjacent the permafrost forming the wall thereof.

3. The method of claim 1 where the foam temperature is below 40° F.

4. The method of claim 1 where the liquid is water.

5. The method of claim 2 where the water contains more than 3-½ percent by weight salt.

6. The method of claim 3 where the water contains about 10 percent by weight salt.

7. The method of drilling a hole in permafrost comprising forming a gas-liquid foam, injecting said foam down a hole in permafrost, circulating said foam up said hole adjacent the wall thereof, forming an annular ring of frozen foam on the outer periphery of the foam circulating up said hole adjacent to the permafrost forming the wall of the hole to provide insulation between the circulating foam and the permafrost and continuing to circulate foam up said hole to carry cuttings from said hole.

8. The method of claim 7 where the liquid is water.

9. The method of claim 8 where the water contains more than 3-½ percent by weight salt.

10. The method of claim 9 where the water contains about 10 percent by weight salt.

11. In a hole penetrating permafrost an annular ring of frozen foam formed by freezing a gas-liquid foam adjacent the permafrost forming the wall of the hole.

* * * * *